(12) United States Patent
Jung et al.

(10) Patent No.: US 9,703,130 B2
(45) Date of Patent: Jul. 11, 2017

(54) LUMINOUS FLUX CONTROL MEMBER LIGHT-EMITTING UNIT, AND DISPLAY DEVICE

(71) Applicant: LG INNOTEK CO., LTD., Seoul (KR)

(72) Inventors: Ji Young Jung, Seoul (KR); Chang Hyuck Lee, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 246 days.

(21) Appl. No.: 14/598,310

(22) Filed: Jan. 16, 2015

(65) Prior Publication Data

US 2015/0301379 A1 Oct. 22, 2015

(30) Foreign Application Priority Data

Jan. 17, 2014 (KR) ........................ 10-2014-0006274

(51) Int. Cl.
*G02F 1/1335* (2006.01)
*G02F 1/133* (2006.01)
*G02B 19/00* (2006.01)

(52) U.S. Cl.
CPC ..... *G02F 1/13306* (2013.01); *G02B 19/0028* (2013.01); *G02B 19/0061* (2013.01); *G02F 1/133602* (2013.01); *G02F 1/133603* (2013.01); *G02F 2001/133607* (2013.01); *G02F 2001/133612* (2013.01)

(58) Field of Classification Search
CPC . H01L 2224/48091; H01L 2224/48465; H01L 2924/00; G02B 19/0028; G02B 19/0061; F21V 7/0091; F21V 5/04; G02F 1/133603; F21Y 2115/10
See application file for complete search history.

(56) References Cited

U.S. PATENT DOCUMENTS

| | | |
|---|---|---|
| 2009/0032827 A1 | 2/2009 | Smits |
| 2012/0032202 A1 | 2/2012 | Ogata et al. |
| 2012/0086875 A1 | 4/2012 | Yokota |
| 2013/0044496 A1* | 2/2013 | Seki ............... H01L 33/507 362/311.02 |
| 2013/0063950 A1* | 3/2013 | Saito ................. F21V 5/02 362/309 |
| 2013/0088857 A1 | 4/2013 | Lee et al. |

(Continued)

FOREIGN PATENT DOCUMENTS

KR 10-2010-0028170 A 3/2010
KR 10-2013-0061796 A 6/2013

OTHER PUBLICATIONS

European Search Report dated Jun. 1, 2015 issued in Application No. 15151361.1.

*Primary Examiner* — Huyen Ngo
(74) *Attorney, Agent, or Firm* — Ked & Associates LLP (57) ABSTRACT

A luminous flux control member may include an incident surface, a first optical surface, and a second optical surface. The first optical surface may be separated from the incident surface in a direction of an optical axis and includes a concave portion recessed toward the incident surface. The second optical surface may form a side surface of the luminous flux control member. The first optical surface may include a connection portion that connects the concave portion to the second optical surface. In at least one embodiment, the connection portion may have a width ranging from 1 μm to 100 μm.

19 Claims, 7 Drawing Sheets

(56) References Cited

U.S. PATENT DOCUMENTS

| | | | |
|---|---|---|---|
| 2014/0043826 A1* | 2/2014 | Seo | F21V 13/04 362/309 |
| 2014/0355273 A1* | 12/2014 | Saito | F21V 5/04 362/309 |
| 2015/0176801 A1* | 6/2015 | Takatori | F21V 5/04 362/97.1 |
| 2015/0260371 A1* | 9/2015 | Takatori | G02F 1/133603 362/97.1 |

\* cited by examiner

LUMINOUS FLUX CONTROL MEMBER LIGHT-EMITTING UNIT, AND DISPLAY DEVICE

CROSS-REFERENCE TO RELATED APPLICATION

This application claims priority to and the benefit of Korean Patent Application No. 10-2014-0006274, filed on Jan. 17, 2014, the disclosure of which is incorporated herein by reference in its entirety.

BACKGROUND

1. Field of the Invention

The present application relates to a luminous flux control member, a light-emitting unit, and a display device.

2. Discussion of Related Art

A liquid crystal display (LCD) is a device that changes a variety of electrical information, which has been generated by various devices, to visual information using a variation in liquid crystal transmittance depending on an applied voltage and transmits the visual information. The liquid crystal display has no light-emitting capability and thus requires a back light, but has small power consumption and can be embodied in a small weight and small thickness. Accordingly, the liquid crystal display is widely used.

The liquid crystal display has no light-emitting capability and thus has a backlight unit (BLU) as a light-emitting unit that provides light to a rear surface of a liquid crystal panel on which an image is displayed.

The liquid crystal display includes a liquid crystal panel having a color filter substrate and an array substrate which are separated from each other with a predetermined gap therebetween and which face each other and a liquid crystal layer interposed between the color filter substrate and the array substrate and a backlight unit that irradiates the liquid crystal panel with light.

The backlight unit used in the liquid crystal display can be classified into an edge type and a direct type depending on the positions of light-emitting diodes as light sources.

In an edge type backlight unit, light-emitting diodes as light sources are arranged on a side surface of a light guide plate and the light guide plate applies light emitted from the light-emitting diodes to the liquid crystal panel using total reflection and the like.

In a direct type backlight unit, a diffusing plate is used instead of the light guide plate and light-emitting diodes are arranged on the rear surface of the liquid crystal panel. Accordingly, the light-emitting diodes apply light to the rear surface of the liquid crystal panel.

On the other hand, illuminance uniformity in a liquid crystal display is an important factor for determining quality of the liquid crystal display. The backlight unit has to uniformly apply light to the liquid crystal panel.

BRIEF DESCRIPTION OF THE DRAWINGS

The embodiments will be described in detail with reference to the following drawings in which like reference numerals refer to like elements wherein.

The above and other objects, features and advantages of the present application will become more apparent to those skilled in the art by describing in detail exemplary embodiments thereof with reference to the accompanying drawings, in which.

DETAILED DESCRIPTION

The present application can be modified in various forms and exemplary embodiments thereof will be described below and illustrated in the drawings. However, the exemplary embodiments are not intended to limit the invention, but it should be understood that the invention includes all the modifications, equivalents, and replacements belonging to the concept and the technical scope of the invention.

Terms including an ordinal number, such as "first" and "second", can be used to describe various elements, but the elements should not be limited to the terms. The terms are used only to distinguish an element from another element. For example, a second element may be referred to as a first element without departing from the scope of the invention and a first element may also be similarly referred to as a second element. The term "and/or" includes a combination of a plurality of relevant items or any one of the plurality of relevant items.

Suffixes such as "module" and "unit" described in the following description are attached to element names or mixed in consideration of only facilitation of description and do not have any distinguishing meanings or roles.

If it is mentioned that an element is "connected to" or "coupled to" another element, it should be understood that still another element may be interposed therebetween, as well as that the element may be connected or coupled directly to the other element. On the contrary, if it is mentioned that an element is "connected directly to" or "coupled directly to" another element, it should be understood that still another element is not interposed therebetween.

Terms used in the following description are intended to merely describe specific embodiments, but are not intended to limit the invention. An expression of the singular number includes an expression of the plural number, unless indicated otherwise. The terms such as "include" and "have" are intended to indicate that features, numbers, steps, operations, elements, components, or combinations thereof used in the following description exist and it should thus be understood that the possibility of existence or addition of one or more other different features, numbers, steps, operations, elements, components, or combinations thereof is not excluded.

All terms used herein including technical or scientific terms have the same meanings as generally understood by those skilled in the art, unless indicated otherwise. The same terms, which are generally used, as defined in dictionaries should be defined to have the same meanings as in context of the related art, but should not be defined to have ideal or excessively-formal meanings.

Exemplary embodiments of the invention will be described in detail below with reference to the accompanying drawings. Identical or corresponding elements will be referenced by identical reference numerals and description thereof will not be repeated.

In an exemplary embodiment of the invention, there is provided a luminous flux control member in which two optical surfaces constituting an outer surface function as reflecting surfaces so as to improve illuminance uniformity.

Figure 1:
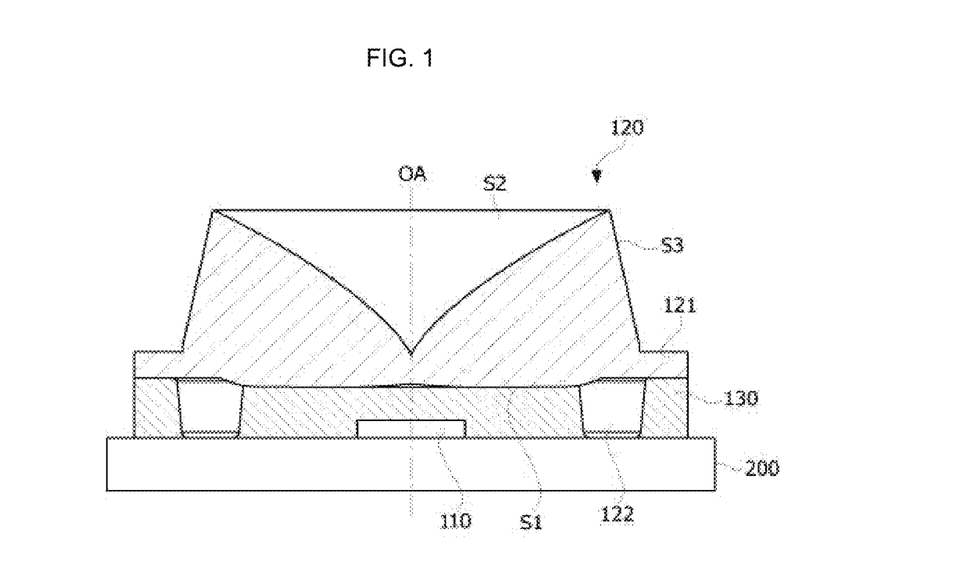
FIG. 1 is a lateral cross-sectional view illustrating a light-emitting unit according to an exemplary embodiment of the invention.

FIG. 1 is a lateral cross-sectional view of a light-emitting unit according to an exemplary embodiment of the invention in which the light-emitting unit is cut along a direction of an optical axis.

Referring to FIG. 1, a light-emitting unit includes a light-emitting element 110, a luminous flux control member 120, and a drive substrate 200.

The light-emitting element 110 is disposed on the drive substrate 200 and is electrically connected to a circuit pattern formed on the drive substrate 200. The light-emitting element 110 may be a chip or a package. The light-emitting element 110 may employ various types of optical elements that convert an electrical signal to an optical signal. In an exemplary embodiment of the invention, the light-emitting element 110 is a light-emitting diode functioning as a dot light source.

The luminous flux control member 120 functions to improve illuminance uniformity of the light-emitting unit by refracting light incident from the light-emitting element 110 as a light source to control an optical path.

The luminous flux control member 120 may include optical lenses.

The luminous flux control member 120 may be disposed to cover at least a part of the outer surface of the light-emitting element 110. The luminous flux control member 120 is embodied in a shape in which a first optical surface S2 is recessed toward the light-emitting element 110.

The luminous flux control member 120 may be separated from the light-emitting element 110 as illustrated in FIG. 1. In this case, light emitted from the light-emitting element 110 may be incident on the luminous flux control member 120 through a surface of the luminous flux control member 120 which is disposed to face the light-emitting element 110. That is, an incident surface is formed by an outer surface of the luminous flux control member 120.

The luminous flux control member 120 may be embodied in an integrated optical lens (IOL) type, that is, a light-emitting element integrated type, in which at least a part of the light-emitting element 110 is accommodated in the luminous flux control member 120. In this case, light emitted from the light-emitting element 110 may be incident on the luminous flux control member 120 through an interface between the luminous flux control member 120 and the outer surface of the light-emitting element 110. The interface between the luminous flux control member 120 and the outer surface of the light-emitting element 110 functions as an incident surface on which light is incident from the light-emitting element 110.

The luminous flux control member 120 includes an incident surface S1 on which light from the light-emitting element 110 is incident, a first optical surface S2 that is separated from the incident surface S1 in a direction of an optical axis (OA), and a second optical surface S3 that extends from the first optical surface S2 toward the incident surface S1.

The optical axis (OA) may be a virtual line indicating a traveling direction of light at the center of a stereoscopic luminous flux emitted from the light-emitting element 110 or a virtual line connecting the center of the incident surface S1 to the center of the first optical surface S2. Accordingly, in the luminous flux control member 120, the center of the incident surface S1 formed on the bottom and the center of the first optical surface S2 formed on the top may be located on the optical axis (OA).

The luminous flux control member 120 may further include a flange 121. The flange 121 is an edge that protrudes from the entire periphery of the luminous flux control member 120 for the purpose of reinforcing the luminous flux control member 120. The flange 121 includes a top surface 121a connected to the second optical surface S3 and a bottom surface 121b connected to the incident surface S1.

For the purpose of separation from the light-emitting element 110, the luminous flux control member 120 may further include a plurality of support portions 122 that protrude from the bottom surface of the flange 121 or the incident surface S1 in the direction of the optical axis (OA).

When the luminous flux control member 120 is disposed so as to be separated from the light-emitting element 110 as illustrated in FIG. 1, a filler 130 may be disposed to surround the light-emitting element 110 and the luminous flux control member 120 may be disposed on the filler 130. That is, the filler may fill a space between the incident surface S1 of the luminous flux control member 120 and the light-emitting element 110. Light emitted from the light-emitting element 110 passes through the filler 130 and is incident on the luminous flux control member 120 through the incident surface S1 of the luminous flux control member 120.

On the other hand, FIG. 1 illustrates an example in which one light-emitting element 110 and one luminous flux control member 120 are disposed on one drive substrate 200, but the invention is not limited to this example. For example, a plurality of light-emitting elements 110 may be disposed on one drive substrate 200. For example, a plurality of luminous flux control members 120 may be disposed to correspond to one light-emitting element 110.

The shape of a luminous flux control member according to an exemplary embodiment of the invention will be described in detail below with reference to FIGS. 2 to 6.

FIGS. 2 to 6 illustrate an example in which the luminous flux control member 120 includes the flange 121 and the support portions 122, but the invention is not limited to this example. The luminous flux control member 120 may not include the flange 121 or the support portions 122.

Figure 2:
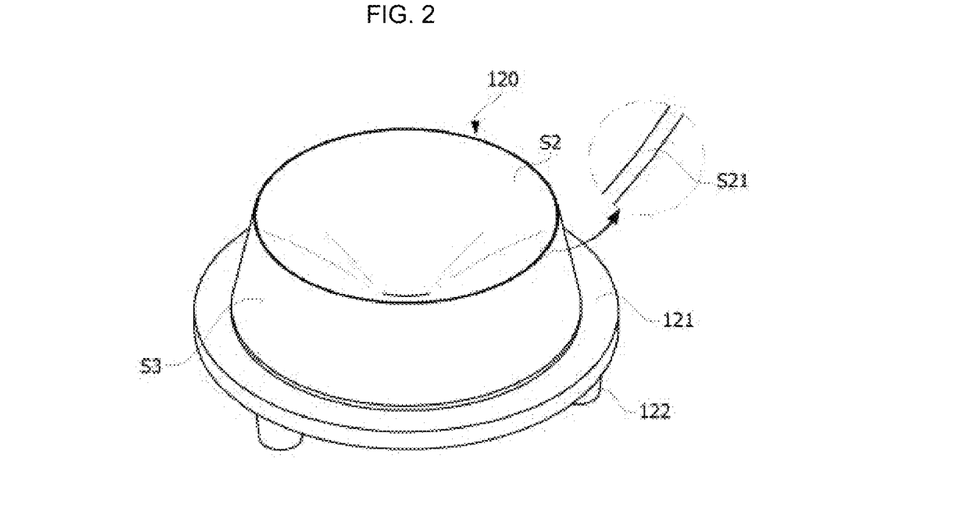
FIG. 2 is a perspective view illustrating a luminous flux control member according to an exemplary embodiment of the invention.
Figure 3:
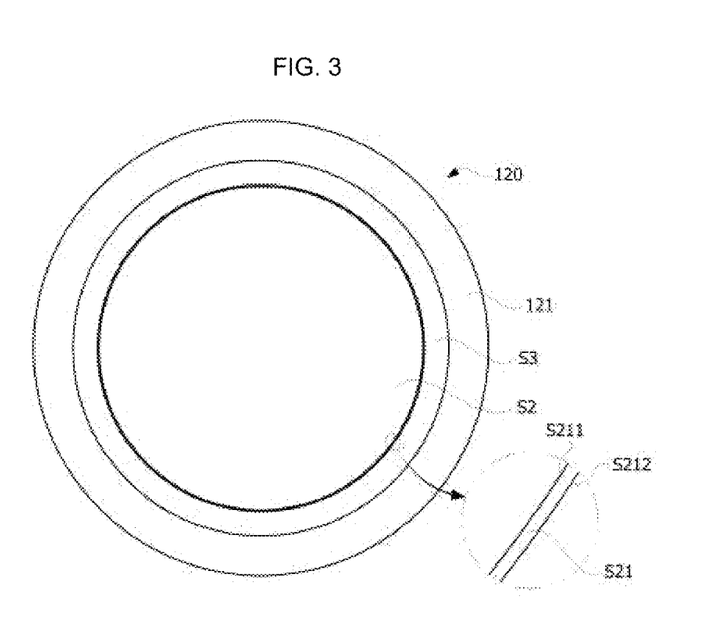
FIG. 3 is a top view of the luminous flux control member according to the exemplary embodiment of the invention.
Figure 4:
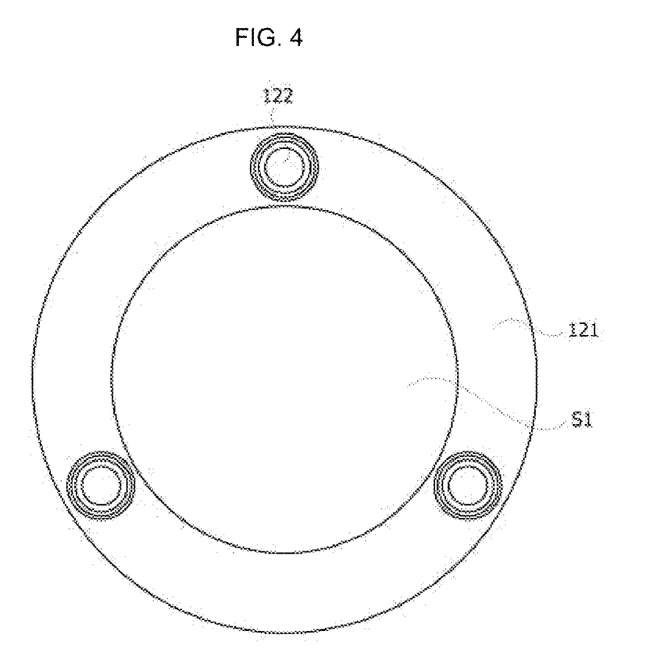
FIG. 4 is a bottom view of the luminous flux control member according to the exemplary embodiment of the invention.
Figure 5:
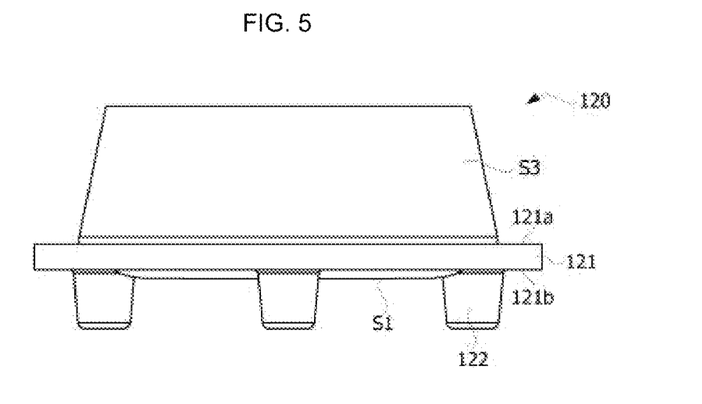
FIG. 5 is a side view of the luminous flux control member according to the exemplary embodiment of the invention.
Figure 6:
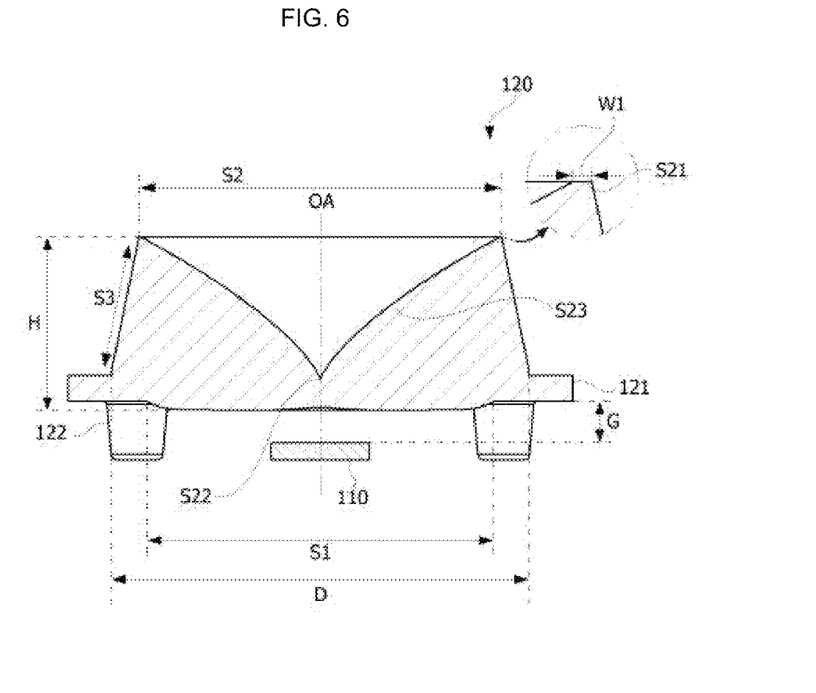
FIG. 6 is a lateral cross-sectional view of the luminous flux control member according to the exemplary embodiment of the invention in which the luminous flux control member is cut along a direction of an optical axis.
Figure 7:
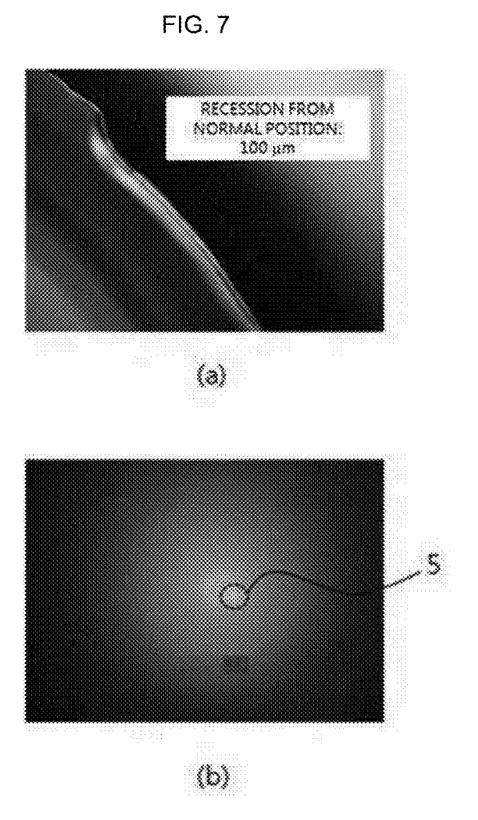
FIG. 7 shows diagrams illustrating a phenomenon of light splash due to deformation of an edge of the luminous flux control member.
Figure 8:
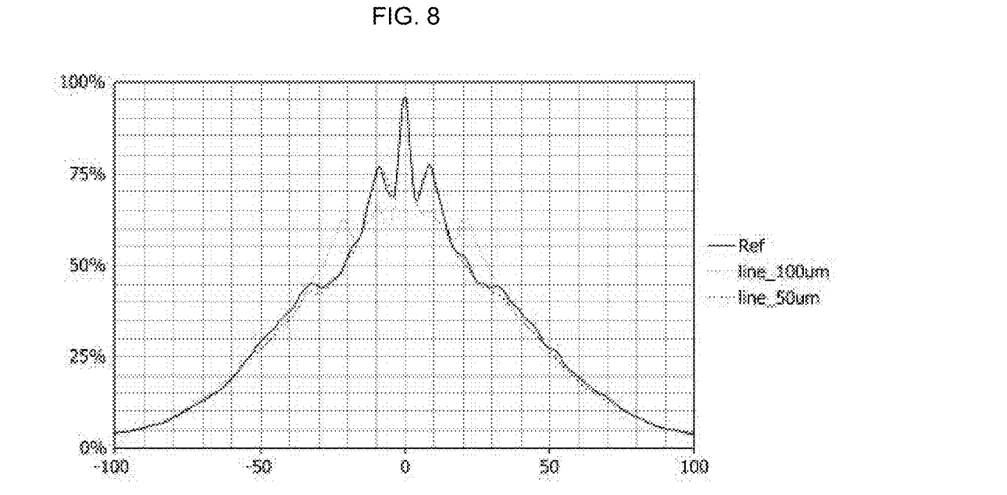
FIG. 8 is a graph illustrating optical characteristics of the luminous flux control member depending on the width of a connection portion formed on a first optical surface.

FIG. 2 is a perspective view illustrating a luminous flux control member according to an exemplary embodiment of the invention, FIGS. 3 to 5 are a top view, a bottom view, and a side view of the luminous flux control member according to the exemplary embodiment of the invention, respectively. FIG. 6 is a lateral cross-sectional view of the luminous flux control member according to the exemplary embodiment of the invention in which the luminous flux control member is cut along the direction of the optical axis. FIG. 7 is a diagram illustrating a phenomenon of light splash occurring due to deformation of an edge of the luminous flux control member. FIG. 8 illustrates optical characteristics of the luminous flux control member depending on the width of a connection portion that is formed in the first optical surface.

Referring to FIGS. 2 to 6, the luminous flux control member 120 includes an incident surface S1 which is disposed to face the light-emitting element 110 and on which light emitted from the light-emitting element 110 is incident, a first optical surface S2 that is separated from the incident surface S1 in the direction of the optical axis (OA) and is recessed toward the incident surface S1, and a second optical surface S3 that extends from the first optical surface S2 to the incident surface S1.

The incident surface S1 is formed on the surface of the luminous flux control member 120 facing the light-emitting element 110. On the other hand, FIGS. 2 to 6 illustrate an example in which the light-emitting element 110 is located outside the luminous flux control member 120, but the luminous flux control member 120 may be an IOL type in which the light-emitting element 110 is accommodated therein. In this case, the incident surface S1 of the luminous flux control member 120 is not the outer surface of the luminous flux control member 120, but an inner surface corresponding to the interface between the luminous flux control member 120 and the light-emitting element 110.

The incident surface S1 may include a flat surface. The incident surface S1 may include a spherical surface or an aspherical surface.

When the incident surface S1 includes a flat surface, a cross-section of the incident surface S1 taken along the direction of the optical axis (OA) may include a flat section. When the incident surface S1 includes a spherical surface or an aspherical surface, a cross-section of the incident surface S1 taken along the direction of the optical axis (OA) may include a curved section.

Referring to FIG. 6, the cross-section of the incident surface S1 taken along the direction of the optical axis (OA) may include a curved section connecting the center to the edge.

The incident surface S1 may include a concave portion that is recessed toward the first optical surface S2. In this case, a part or all of the light-emitting element 110 may be accommodated in the concave portion of the incident surface S1.

The incident surface S1 may include a protruding portion that protrudes toward the light-emitting element 110.

Referring to FIG. 6, the incident surface S1 includes a concave portion that is recessed toward the first optical surface S2 at the center thereof and a protruding portion that protrudes toward the light-emitting element 110 on the surface connecting the center to the edge.

The incident surface S1 may have a rotationally-symmetric structure with respect to the optical axis (OA). In this case, the incident surface S1 may be formed in a circular shape as illustrated in FIG. 4.

The incident surface S1 may have a rotationally-asymmetric structure with respect to the optical axis (OA).

The first optical surface S2 is separated from the incident surface S1 in the direction of the optical axis (OA) and may include a concave portion S23 that is recessed toward the incident surface S1 and a connection portion S21 extending from the edge of the concave portion S23

A center S22 of the concave portion S23 is recessed toward the incident surface and the center S22 of the concave portion S23 corresponds to the center of the first optical surface S2.

The center S22 of the concave portion S23 may be located on the optical axis OA.

The center S22 of the concave portion S23 may be recessed deeper toward the incident surface S1.

Referring to FIG. 6, the center S22 of the concave portion S23 is recessed toward the incident surface S1 by half the height H of the luminous flux control member 120 or greater, excluding the support portion 122.

The concave portion S23 may connect the center S22 to the edge with a curve. That is, the concave portion S23 may connect the center S22 of the concave portion S23 to the connection portion S21 on the periphery of the concave portion S23 in a curved shape. The shape of the curve connecting the center S22 of the concave portion S23 to the connection portion S21 may be a curved shape convex to the optical axis OA.

The connection portion S21 extends from the edge of the concave portion S23 in the peripheral direction (direction perpendicular to the optical axis) of the second optical surface S3 to form a peripheral portion of the first optical surface S2.

The connection portion S21 functions to connect the concave portion S23 to the second optical surface S3 and to protect the concave portion S23 from a deformation such as a recess. Specifically, the connection portion S21 has a ring shape with a predetermined width W1, the inner peripheral surface S211 of the ring is connected to the edge of the concave portion S23, and the outer peripheral surface S212 of the ring is connected to the second optical surface S3.

When the edge of the concave portion S23 is directly connected to the second optical surface S3, the concave portion S23 and the second optical surface S3 form a sharp edge. In the manufacturing of the shape of the luminous flux control member 120, a deformation such as a recess may occur in the edge formed by the first optical surface S2 and the second optical surface S3 due to an external environment. The deformation of the edge formed by the first optical surface S2 and the second optical surface S3 may serve as a factor for causing the phenomenon of light splash in a light-emitting unit.

Referring to FIGS. 7A and 7B, when deformation by recess occurs in the edge of the luminous flux control member 120 as illustrated in FIG. 7A, an area 5 in which illuminance is abnormally high in a region separate from the center of an illuminance surface of the luminous flux control member 120 due to the phenomenon of light splash is generated as illustrated in FIG. 7B.

Therefore, in the exemplary embodiment of the invention, the luminous flux control member 120 unsusceptible to recessing is provided by disposing the connection portion S21 as an allowance portion between the concave portion S23 and the second optical surface S3. The connection portion S21 functions as a protective section for protecting the concave portion S23, which is an important portion for determining the optical characteristics of the luminous flux control member 120, from recessing or the like and forms an edge less susceptible to recessing than the concave portion S23.

On the other hand, when the width W1 of the connection portion S21 is excessively large, the illuminance distribution of the luminous flux control member 120 may be adversely influenced. Accordingly, it is necessary to limit the width of the connection portion S21.

Referring to FIG. 8, it can be seen that the illuminance distribution of the luminous flux control member 120 is insignificantly influenced when the width W1 of the connection portion S21 is equal to or less than 50 mm, but the illuminance distribution of the luminous flux control member 120 is changed when the width W1 of the connection portion S21 is greater than 70 mm.

On the other hand, the width W1 of the connection portion S21 may vary depending on the size of the luminous flux control member 120 and products to which the luminous flux control member 120 is applied. For example, when the luminous flux control member 120 is applied to a 42" backlight unit and the width W1 of the connection portion S21 is equal to or less than 100 mm, the illuminance distribution of the luminous flux control member 120 is insignificantly influenced.

Although not limited, the width of the connection portion S21 preferably ranges from 1 mm to 100 mm.

The connection portion S21 may connect the connection portion S23 to the second optical surface S3 in a linear shape. That is, the connection portion S21 may include a flat surface.

When the connection portion S21 is designed as a flat surface connecting the concave portion S23 to the second optical surface S3, the connection portion S21 may be deformed into a curved surface depending on the shrinkage rate of the luminous flux control member 120 during the course of manufacturing.

In this case, the connection portion S21 may include a curved section connecting the concave portion S23 to the second optical surface S3. That is, the connection portion S21 may include a curved surface. The connection portion S21 may include both a flat section and a curve section that connect the concave portion S23 to the second optical surface S3. That is, the connection portion S21 may include both a curved surface and a flat surface.

When the connection portion S21 includes a curved surface, the connection portion S21 may include a protruding portion that protrudes to the outside of the luminous flux control member 120 and has a peak and a valley.

The radius of curvature R of the curved section forming the connection portion S21 is equal to or greater than ½ W1 (the width of the connection portion S21) and the radius of curvature R of the flat section constituting the connection portion S21 may be infinite.

The first optical surface S2 may have a rotationally-symmetric structure with respect to the optical axis (OA). In this case, the incident surface S1 may have a circular shape as illustrated in FIG. 3. Referring to FIG. 3, the first optical surface S2 may have a diameter smaller than the maximum diameter of the second optical surface S3.

The second optical surface S3 forms an outer side surface of the luminous flux control member 120. The second optical surface S3 may be inclined with respect to the optical axis (OA).

The second optical surface S3 may extend from the connection portion S21 of the first optical surface S2 to a lateral-bottom side.

The second optical surface S3 may be bent from the connection portion S21 of the first optical surface S2. That is, the second optical surface S3 and the connection portion S21 may form an edge.

In this description, the bending means a shape in which two surfaces are connected to form an edge. For example, when two surfaces are connected to form an edge with a radius of curvature of about 0.2 mm or less, it can be said that the two surfaces are bent.

When the luminous flux control member 120 does not include the flange 121, the second optical surface S3 may be formed as a surface connecting the first optical surface S2 to the incident surface S1. In this case, the second optical surface S3 may include a flat section or a curved section connecting the first optical surface S2 to the incident surface S1.

When the luminous flux control member 120 includes the flange 121, the second optical surface S3 may be formed as a surface connecting the first optical surface S2 to the flange S21. In this case, the second optical surface S3 may include a flat section or a curved section connecting the first optical surface S2 to the flange 121.

The second optical surface S3 may have a rotationally-symmetric structure with respect to the optical axis (OA). In this case, the second optical surface S3 has a circular cross-section perpendicular to the optical axis (OA) as illustrated in FIG. 3.

The second optical surface S3 may be designed so that the maximum diameter thereof is greater than the diameter of the first optical surface S2 and the minimum diameter S3 is equal to the diameter of the first optical surface S2.

The second optical surface S3 may be disposed as a curved surface in which the closer it becomes to the first optical surface S2, the closer it becomes to the optical axis (OA). That is, the diameter of the second optical surface S3 becomes larger as it becomes closer to the incident surface S1 and becomes smaller as it becomes closer to the first optical surface S2.

The flange 121 is formed to protrude from the entire periphery of the luminous flux control member 120 and is disposed between the second optical surface S3 and the incident surface S1. That is, the flange 121 connects the second optical surface S3 to the incident surface S1.

The flange 121 has a diameter greater than the maximum diameter of the second optical surface S3 as illustrated in FIG. 3 and has an inner surface in contact with the periphery of the second optical surface S3 as illustrated in FIG. 4.

The support portion 122 is a support means for separating the incident surface S1 of the luminous flux control member 120 from the light-emitting element 110 and protrudes from the flange 121 or the incident surface S1 in the direction of the optical axis (OA).

Referring to FIG. 4, three support portions 122 are formed to protrude from the bottom surface of the flange 121.

The support portion 122 has a length greater than the height of the light-emitting element 110 so as to separate the incident surface S1 of the luminous flux control member 120 from the light-emitting element 110 by a predetermined gap.

Referring to FIG. 6, the incident surface S1 and the light-emitting element 110 are separated from each other by a predetermined gap so as to guarantee illuminance uniformity. For example, the gap G between the incident surface S1 and the light-emitting element 110 ranges from 0.1 mm to 2 mm.

In the luminous flux control member 120 having the aforementioned structure, the ratio (D/H) of the diameter (D) to the height (H) ranges from 0.5 to 5. For example, the ratio (D/H) of the diameter (D) to the height (H) is 2.5. Here, the diameter (D) may be the maximum diameter of the part of the luminous flux control member 120, excluding the flange, that is, the maximum diameter of the second optical surface S3.

When the cross-section of the incident surface S1, the first optical surface S2, or the second optical surface S3 taken along the direction of the optical axis (OA) includes a curved section, the curved section may satisfy a spline curve which is a nonlinear numerical analysis technique.

The spline curve, as a function for forming a smooth curve with a small number of control points, may define an interpolation curve passing through selected control points and an approximate curve of a line connecting the selected control points. A B-spline curve, a Bezier curve, a non-uniform rational B-spline (NURBS) curve, a cubic spline curve, and the like can be used as the spline curve.

For example, the curved section constituting the cross-section of each surface can be expressed by a Bezier curve equation.

The Bezier curve equation is a function for acquiring various free curves by movement of a start point as a first control point, an end point as a final control point, and internal control points located therebetween and may be expressed by Expression 1.

$$B(u) = \sum_{k=0}^{N} P_k \frac{N!}{k!(N-k)!} u^k (1-u)^{N-k}$$ Expression 1

In Expression 1, B(u) represents a continuous function for calculating a curve acquired by N control points located at different positions, N represents a parameter for determining the order of the Bezier curve equation, and $P_k$ represents the coordinate of the k-th control point and includes N+1 control points. Here, u is a real number in the range of 0 to 1 and represents a curved section in which the control points are segmented in the range of 0 to 1.

$$\frac{N!}{k!(N-k)!} u^k (1-u)^{N-k}$$

in the Bezier curve equation B(u) is a blending function which is a function for generating a curve by blending the control points. The Bezier curve may have a varying shape depending on the positions of the control points.

The luminous flux control member 120 having the aforementioned structure may cause a part of light incident from the light-emitting element 110 to travel through a first optical path in which light is totally reflected onto the second optical surface S3 through the use of the first optical surface S2, is reflected through the use of the second optical surface S3, and is then emitted therefrom and a second optical path in which light is totally reflected onto the first optical surface S2 through the use of the second optical surface S3, is refracted through the use of the first optical surface S2, and is emitted to the outside.

Optical characteristics of the luminous flux control member according to the exemplary embodiment of the invention will be described in detail below with reference to FIG. 9.

Figure 9:
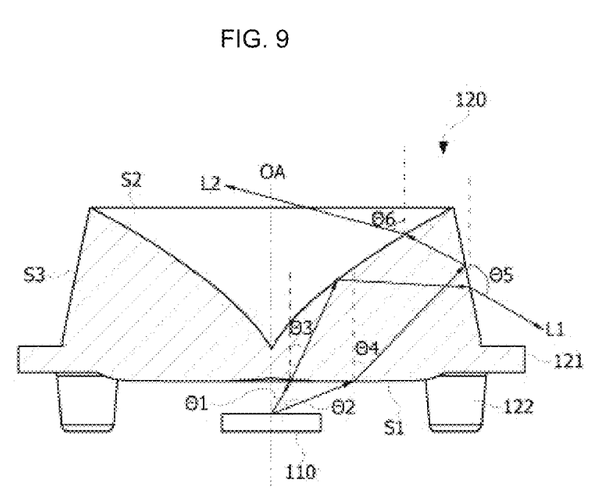
FIG. 9 is a diagram illustrating examples of an optical path in the luminous flux control member according to the exemplary embodiment of the invention.

FIG. 9 is a diagram illustrating optical characteristics of the luminous flux control member 120 according to the exemplary embodiment of the invention.

The incident surface S1 of the luminous flux control member 120 functions to refract light incident from the light-emitting element 110 and to cause the refracted light to travel onto the first optical surface S2 or the second optical surface S3.

When light emitted from the light-emitting element 110 is incident, the incident surface S1 refracts the incident light depending on the incidence angle thereof to travel to the inside of the luminous flux control member 120.

When light passing through the inside of the luminous flux control member 120 is incident, the first optical surface S2 refracts a part of the incident light to be emitted from the luminous flux control member 120 and totally reflects the remaining incident light to be incident on the second optical surface S3.

When light passing through the inside of the luminous flux control member 120 is incident, the second optical surface S3 refracts a part of the incident light to be emitted from the luminous flux control member 120 and totally reflects the remaining incident light to be incident on the first optical surface S2.

When the light totally reflected by the second optical surface S3 is incident, the first optical surface S2 refracts the incident light to be emitted from the luminous flux control member 120.

When light totally reflected by the first optical surface S2 is incident, the second optical surface S3 refracts the incident light to be emitted from the luminous flux control member 120.

In FIG. 9, the traveling angle of light is defined by a left-hand rule with respect to the Y axis parallel to the optical axis (OA). In this case, the clockwise direction about the Y axis is defined to be positive (+) and the counterclockwise direction is defined to be negative (−).

For the purpose of convenience of explanation in the following description, angles at which light emitted from the light-emitting element 110 is incident on the incident surface S1 are defined as θ1 and θ2, and angles at which the light refracted by the incident surface S1 travels to the first optical surface S2 and the second optical surface S3 are defined as θ3 and θ4, respectively. Angles at which the light reflected by the first optical surface S2 and the second optical surface S3 is reflected to be emitted to the outside by the second optical surface S3 and the first optical surface S2 are defined as θ5 and θ6, respectively.

Referring to FIG. 9, in the first optical path, the first optical surface S2 functions as a totally-reflecting surface that totally reflects a part of light incident through the incident surface S1 to the second optical surface S3.

A part of light refracted by the incident surface S1 is totally reflected by the first optical surface S2, is incident on the second optical surface S3, is refracted to be emitted from the luminous flux control member 120 by the second optical surface S3.

Light traveling through the first optical path satisfies "emission angle/incidence angle>0".

First light L1 illustrated FIG. 9 will be described below as an example. The first light L1 with an incidence angle θ1 of light incident on the luminous flux control member 120 traveling from the light-emitting element 110 is refracted by the incident surface S1 and is changed to a traveling angle θ3. The first light L1 traveling at the angle θ3 is incident on the first optical surface S2 and is reflected by the first optical surface S2. The first light reflected by the first optical surface S2 is incident on the second optical surface S3 and is refracted to be emitted to the outside at an angle θ5 by the second optical surface S3.

In the traveling path of the first light L1, the first light L1 is incident at a positive angle θ1, is reflected by the first optical surface S2, and is finally refracted at a positive angle θ5 to be emitted to the outside through the use of the second optical surface S3. Therefore, both the incidence angle θ1 and the emission angle θ5 are positive and satisfy "θ5/θ1>0".

On the other hand, in the second optical path, the first optical surface S2 functions as a refracting surface that refracts the light totally reflected by the second optical surface S3 to be emitted from the luminous flux control member 120. That is, a part of light refracted by the incident surface S1 is reflected by the second optical surface S3 and, is then incident on the first optical surface S2. The first optical surface S2 refracts the incident light to be emitted from the luminous flux control member 120.

Light traveling through the second optical path satisfies "emission angle/incidence angle<0".

Second light L2 illustrated FIG. 9 will be described below as an example. The second light L2 with an incidence angle θ2 of light incident on the luminous flux control member 120 traveling from the light-emitting element 110 is refracted by the incident surface S1 and is changed to a traveling angle θ4. The second light L2 traveling at the angle θ4 is incident on the second optical surface S3 and is totally reflected by the second optical surface S3. The second light totally reflected by the second optical surface S3 is incident on the first optical surface S2 and is refracted to be emitted to the outside at an angle θ6 by the first optical surface S2.

In the traveling path of the second light L2, the second light L2 is incident at a positive angle θ2, is reflected by the second optical surface S3, and is finally refracted at a negative angle θ6 to be emitted to the outside through the use of the first optical surface S2. Therefore, one of the incidence angle and the emission angle is negative and the other is positive, whereby "θ6/θ2<0" is satisfied.

On the other hand, the luminous flux control member 120 can cause a part, which satisfies a predetermined condition, of incident light to travel through the first optical path or the second optical path.

For example, the luminous flux control member 120 can cause a part, which travels through the incident surface S1 and has a traveling angle within ±60 degrees, of the incident light to travel through the first optical path or the second optical path. On the other hand, the incidence angle range of light which travels through the incident surface S1 and which has a traveling angle within ±60 degrees may be within ±85 degrees. That is, the incident surface S1 refracts a part, which has an incidence angle within ±85 degrees, of the incident light to travel at an angle within ±60 degrees. The light which passes through the incident surface S1 and which has a traveling angle within ±60 degrees is incident on the first optical surface S2 or the second optical surface S3, travels through the first optical path or the second optical path, and is emitted from the luminous flux control member 120.

On the other hand, the incident surface S1 refracts a part, which satisfies a predetermined condition, of the incident light to be incident on the first optical surface S2 and refracts the remaining light to be incident on the second optical surface S3.

For example, the incident surface S1 refracts a part, which has an incidence angle within ±80 degrees, of the incident light to travel to the first optical surface S2 and refracts the remaining incident light to travel to the second optical surface S3. As described above, a part of the light, which passes through the incident surface S1 and is incident on the first optical surface S2 is reflected onto second optical surface S3 and the remaining incident light is refracted and emitted to the outside.

Referring to FIG. 9 again, when the luminous flux control member 120 is divided into two virtual sections using a virtual cross-section including the optical axis (OA), the first optical path and the second optical path in the same section goes to opposite directions with respect to the optical axis. FIG. 9 illustrates the optical path in the right section when the luminous flux control member 120 is divided into two sections with respect to the optical axis (OA).

It is assumed that the first light L1 travels through the first optical path and the second light L2 travels through the second optical path. Then, the first light L1 corresponding to light traveling when the first optical surface S2 functions as a reflecting surface travels and is emitted to the right side with respect to the optical axis (OA). On the contrary, the second light L2 corresponding to light traveling when the second optical surface S3 functions as a reflecting surface travels and is emitted to the left side with respect to the optical axis.

On the other hand, the luminous flux control member 120 according to the exemplary embodiment of the invention is designed so that K satisfies "0.25≤K≤2.5", where K=(θ5-180)/θ6 is defined for the remaining light other than a part traveling within 10 degrees with respect to the optical axis (OA) of incident light or light refracted by the incident surface S1.

That is, when the emission angle of light traveling through the first optical path is changed to be symmetric (θ5-180) with respect to the optical axis (OA) and the resultant angle is expressed by the ratio (K) and the emission angle θ6 of light traveling through the second optical path, the luminous flux control member 120 needs to be designed so that K is within a range of 0.25 to 2.5 in order to improve illuminance uniformity.

The luminous flux control member according to the exemplary embodiment of the invention can be applied to an illumination unit, a backlight unit of a liquid crystal display, or the like.

Figure 10:
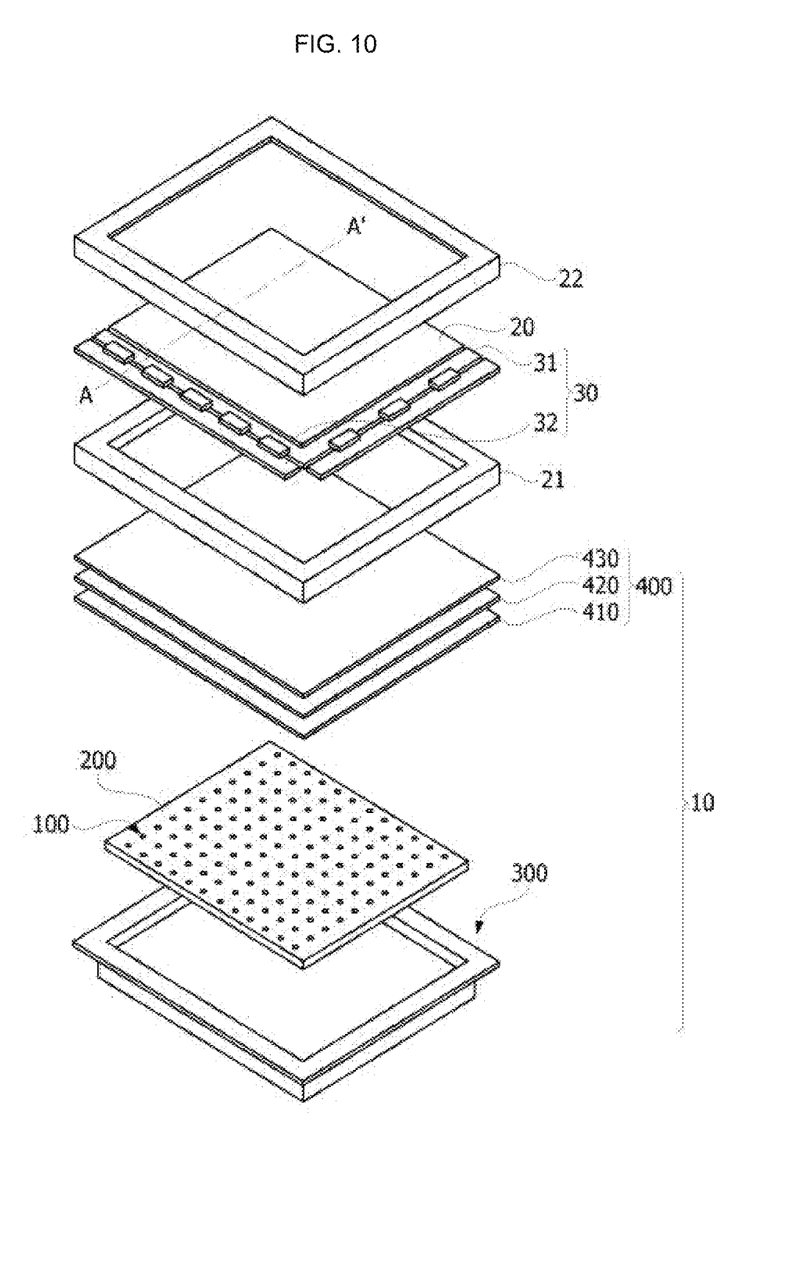
FIG. 10 is an exploded perspective view illustrating a liquid crystal display device according to an exemplary embodiment of the invention.
Figure 11:
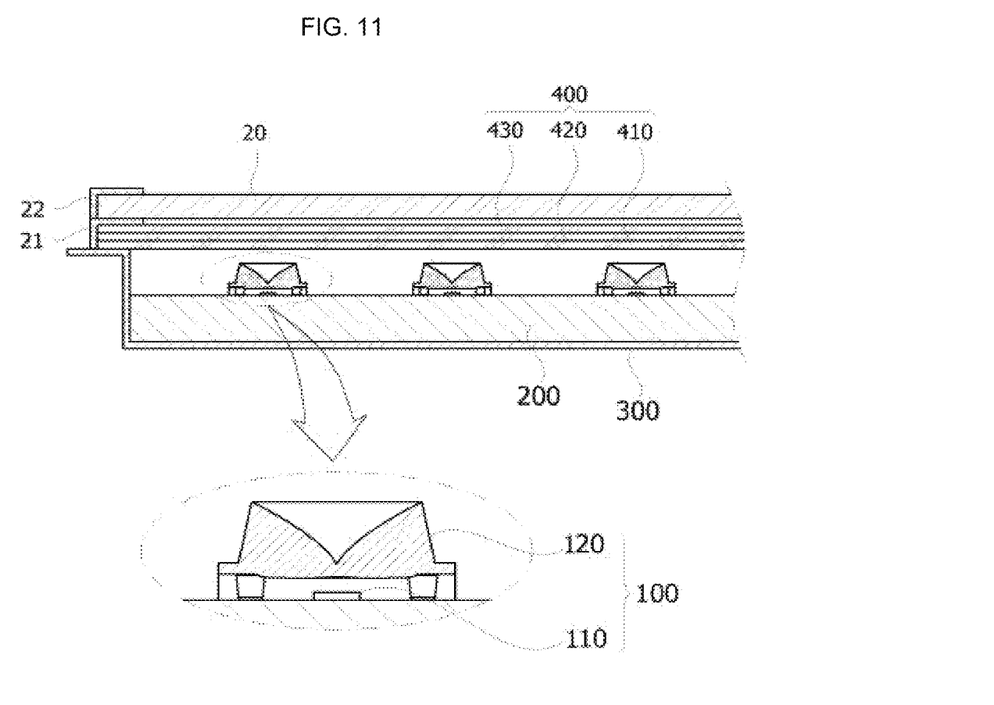
FIG. 11 is a cross-sectional view of a backlight unit according to an exemplary embodiment of the invention taken along line A-A' of FIG. 10.

FIG. 10 is an exploded perspective view of a liquid crystal display according to an exemplary embodiment of the invention to which the luminous flux control member described above with reference to FIGS. 1 to 9 is applied. FIG. 11 is a cross-sectional view of a backlight unit of the liquid crystal display according to the exemplary embodiment of the invention taken along line A-A' of FIG. 10.

Referring to FIGS. 10 and 11, the liquid crystal display includes a backlight unit 10 and a liquid crystal panel 20.

The liquid crystal panel 20 is a display component of the liquid crystal display and includes a thin film transistor (TFT) substrate, a color filter substrate, and a liquid crystal layer interposed between two substrates. The TFT substrate includes a plurality of gate lines, a plurality of data lines intersecting the plurality of gate lines, and thin film transistors (TFT) formed at intersections of the gate lines and the data lines.

A driving circuit unit 30 may be connected to one side of the liquid crystal panel 20.

The driving circuit unit 30 includes a printed circuit board (PCB) 31 that supplies scanning signals to the gate lines of the TFT substrate and a printed circuit board 32 that supplies data signals to the data lines.

The driving circuit unit 30 is electrically connected to the liquid crystal panel 20 in a chip-on-film (COF) manner, a tape carrier package (TCP) manner, or the like.

The liquid crystal display may further include a panel guide 21 that supports the liquid crystal panel 20 and an upper case 22 coupled to the panel guide 21 so as to surround the edge of the liquid crystal panel 20.

The backlight unit 10 is coupled to the liquid crystal panel 20 in a direct type and includes a bottom cover 300, a drive substrate 200, a plurality of light source units 100, and a plurality of optical sheets 400.

The bottom cover 300 is formed of a metal or the like and has a box shape of which the top is opened. For example, the bottom cover 300 may be formed by bending or curving a metal plate or the like.

The drive substrate 200 is accommodated in a space of the bottom cover 300 formed by bending or curving. The bottom cover 300 functions to support the optical sheets 400 and the liquid crystal panel 20.

The drive substrate 200 has a plate shape and a reflecting layer may be formed on the drive substrate 200. The reflecting layer functions to reflect light emitted from the light-emitting element 110 to improve performance of the backlight unit 10.

The plurality of light source units 100 may be mounted on the drive substrate 200.

Each light source unit 100 may include a light-emitting element 110 and a luminous flux control member 120 disposed to cover the light-emitting element 110. FIGS. 9 and 10 illustrate an example in which the light-emitting element 110 is a light-emitting diode.

The light-emitting diodes 110 are disposed on the drive substrate 200 and are electrically connected to the drive substrate 200. The light-emitting diodes 110 emit light in response to a driving signal supplied from the drive substrate 200.

Each light-emitting diode 110 functions as a dot light source and an array of the light-emitting diodes 110 arranged at predetermined intervals on the drive substrate 200 may form a surface light source.

Each light-emitting diode 110 may be disposed in the form of a light-emitting diode package including a light-emitting diode chip. Each light-emitting diode 110 may emit white light or may selectively emit blue light, green light, and red light.

When light emitted from the light-emitting diode 110 is incident, the luminous flux control member 120 functions to control a luminous flux to improve illuminance uniformity.

The luminous flux control member 120 may be provided separate from the light-emitting diode 110. The luminous flux control member 120 may be provided as an IOL type in which the light-emitting diode 110 is accommodated therein.

On the other hand, FIGS. 10 and 11 illustrate an example in which the luminous flux control members 120 are separated from each other and are arranged at predetermined intervals, but the invention is not limited to this example. In some exemplary embodiments of the invention, the luminous flux control members may be embodied in the form in which the plurality of luminous flux control members 120 arranged at predetermined intervals corresponding to the light-emitting diodes 110 are incorporated into one structure.

The optical sheets include a diffusing sheet 410, a polarizing sheet 420, and a prism sheet 430 and may be used to improve characteristics of light passing through the optical sheets 400.

The diffusing sheet 410 causes light incident from the light source unit 100 to travel onto the front surface of the liquid crystal panel 20, diffuses the light so as to have a uniform distribution in a wide range, and applies the diffused light to the liquid crystal panel 20.

The polarizing sheet 420 functions to polarize obliquely-incident of light incident on the polarizing sheet 420 so as to be emitted perpendicularly. At least one polarizing sheet 420 may be disposed under the liquid crystal panel 20 in order to change light emitting from the diffusing sheet 410 to be perpendicular.

The prism sheet 430 transmits light parallel to a transmission axis thereof and reflects light perpendicular to the transmission axis.

On the other hand, in order to satisfactorily ensure illuminance uniformity in the backlight unit 10, it is necessary to form an air gap with a predetermined size between the light-emitting diode 110 and the luminous flux control member 120. In order to realize a wide illuminance distribution, it is necessary to ensure illuminance uniformity by decreasing the size of the light-emitting diode 110 or increasing the size of the luminous flux control member 120.

With a recent increase in demand for an ultrathin liquid crystal display, it has been attempted to reduce the air gap between the light-emitting diode 110 and the luminous flux control member 120. However, the increase in the size of the luminous flux control member 120 is limited due to the decreased air gap, and thus it is difficult to ensure illuminance uniformity.

Therefore, in the exemplary embodiment of the invention, it is possible to effectively diffuse light emitted from the light-emitting diode 110 using the luminous flux control member 120 having two surfaces which functions both as a totally-reflecting surface and a refracting surface. Accordingly, the backlight unit 10 can apply light having improved illuminance uniformity to the liquid crystal panel 20 and thus the liquid crystal display can realize improved image quality with improved illuminance uniformity.

The invention is directed to a luminous flux control member, a light-emitting unit, and a display device with improved illuminance uniformity.

According to an aspect of the invention, there is provided a luminous flux control member including: an incident surface; a first optical surface that is separated from the incident surface in a direction of an optical axis and includes a concave portion recessed toward the incident surface; and a second optical surface that forms a side surface of the luminous flux control member, wherein the first optical surface includes a connection portion that connects the concave portion to the second optical surface.

The connection portion may include a ring shape having a predetermined width, the inner peripheral surface of the ring shape may be connected to the concave portion, and the outer peripheral surface of the ring shape may be connected to the second optical surface.

The connection portion and the second optical surface may form an edge.

The second optical surface may be inclined with respect to the optical axis.

The connection portion may have a width ranging from 1 μm to 100 μm.

The connection portion may extend from the outer periphery of the concave portion in a direction perpendicular to the optical axis.

The connection portion may include a flat section.

The connection portion may include a curved section.

The radius of curvature of the curved section may be equal to or greater than half the width of the connection portion.

The luminous flux control member may further include a flange that includes a top surface connected to the second optical surface and a bottom surface connected to the incident surface.

The luminous flux control member may further include one or more support portions that protrude from the bottom surface of the flange.

A ratio of a height to a diameter in the luminous flux control member may range from 0.5 to 5, the diameter may be the width in a direction perpendicular to the optical axis, and the height may be the optical axial size of the luminous flux control member.

The first optical surface may transmit a part of incidence light passing through the incident surface and may reflect the remaining incidence light onto the second optical surface, and the second optical surface may transmit a part of the incidence light passing through the incident surface and may reflect the remaining incidence light onto the first optical surface.

According to another aspect of the invention, there is provided a light-emitting unit including: a substrate; a plurality of light sources that are disposed on the substrate; and a plurality of luminous flux control members that are disposed on the plurality of light sources, respectively, wherein each luminous flux control member includes an incident surface, a first optical surface that is separated from the incident surface in a direction of an optical axis and includes a concave portion recessed toward the incident surface, and a second optical surface that forms a side surface of the luminous flux control member, and wherein the first optical surface includes a connection portion that connects the concave portion to the second optical surface.

According to still another aspect of the invention, there is provided a display device including: a backlight unit that includes a drive substrate, a plurality of light sources disposed on the drive substrate, and a plurality of luminous flux control members disposed on the plurality of light sources, respectively; a liquid crystal panel that is disposed on the backlight unit; and a driving circuit unit that is electrically connected to the liquid crystal panel, wherein each luminous flux control member includes an incident surface, a first optical surface that is separated from the incident surface in a direction of an optical axis and includes a concave portion recessed toward the incident surface, and a second optical surface that forms a side surface of the luminous flux control member, and wherein the first optical surface includes a connection portion that connects the concave portion to the second optical surface.

In the luminous flux control member according to the aspect of the invention, it is possible to ensure illuminance uniformity regardless of the size of the luminous flux control member and the size of an air gap from the light source.

By forming a protective section in the edge of the luminous flux control member, it is also possible to prevent deformation of the edge of the luminous flux control member during the course of manufacturing to prevent a phenomenon of splash and to guarantee illuminance uniformity.

While exemplary embodiments of the invention have been described above, it will be understood by those skilled in the art that the invention can be modified and changed in various forms without departing from the spirit and scope of the invention described in the appended claims.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A luminous flux control member comprising:
    an incident surface;
    a first optical surface that is separated from the incident surface in a direction of an optical axis and includes a concave portion recessed toward the incident surface; and
    a second optical surface that forms a side surface of the luminous flux control member,
    wherein the first optical surface includes a connection portion that connects the concave portion to the second optical surface,
    wherein the connection portion has a width ranging from 1 μm to 100 μm.

2. The luminous flux control member according to claim 1, wherein the connection portion includes a ring shape having a predetermined width, and
    wherein the inner peripheral surface of the ring shape is connected to the concave portion and the outer peripheral surface of the ring shape is connected to the second optical surface.

3. The luminous flux control member according to claim 1, wherein the connection portion and the second optical surface form an edge.

4. The luminous flux control member according to claim 1, wherein the second optical surface is inclined with respect to the optical axis.

5. The luminous flux control member according to claim 1, wherein the connection portion extends from the outer periphery of the concave portion in a direction perpendicular to the optical axis.

6. The luminous flux control member according to claim 1, wherein the connection portion includes a flat section.

7. The luminous flux control member according to claim 1, wherein the connection portion includes a curved section.

8. The luminous flux control member according to claim 7, wherein a radius of curvature of the curved section is equal to or greater than half the width of the connection portion.

9. The luminous flux control member according to claim 1, further comprising a flange that includes a top surface connected to the second optical surface and a bottom surface connected to the incident surface.

10. The luminous flux control member according to claim 9, further comprising support portions that protrude from the bottom surface of the flange.

11. The luminous flux control member according to claim 1, wherein a ratio of a height to a diameter in the luminous flux control member ranges from 0.5 to 5, and
    wherein the diameter is the width in a direction perpendicular to the optical axis and the height is the optical axial size of the luminous flux control member.

12. The luminous flux control member according to claim 1, wherein the first optical surface transmits a part of incidence light passing through the incident surface and reflects the remaining incidence light onto the second optical surface, and
wherein the second optical surface transmits a part of the incidence light passing through the incident surface and reflects the remaining incidence light onto the first optical surface.

13. A light-emitting unit comprising:
a substrate;
a plurality of light sources that are disposed on the substrate; and
a plurality of luminous flux control members that are disposed on the plurality of light sources, respectively,
wherein each luminous flux control member includes:
an incident surface,
a first optical surface that is separated from the incident surface in a direction of an optical axis and includes a concave portion recessed toward the incident surface, and
a second optical surface that forms a side surface of the luminous flux control member, and
wherein the first optical surface includes a connection portion that connects the concave portion to the second optical surface,
wherein the light-emitting unit further comprises a filler that is disposed between the light source and the incident surface of the luminous flux control member.

14. The light-emitting unit according to claim 13, wherein the connection portion includes a ring shape having a predetermined width, and
wherein the inner peripheral surface of the ring shape is connected to the concave portion and the outer peripheral surface of the ring shape is connected to the second optical surface.

15. The light-emitting unit according to claim 13, wherein the second optical surface is inclined with respect to the optical axis.

16. A display device comprising:
a backlight unit that includes a drive substrate, a plurality of light sources disposed on the drive substrate, and a plurality of luminous flux control members disposed on the plurality of light sources, respectively;
a liquid crystal panel that is disposed on the backlight unit; and
a driving circuit unit that is electrically connected to the liquid crystal panel,
wherein each luminous flux control member includes:
an incident surface,
a first optical surface that is separated from the incident surface in a direction of an optical axis and includes a concave portion recessed toward the incident surface, and
a second optical surface that forms a side surface of the luminous flux control member, and
wherein the first optical surface includes a connection portion that connects the concave portion to the second optical surface,
wherein the connection portion has a width ranging from 1 µm to 100 µm.

17. The display device according to claim 16, wherein the connection portion includes a ring shape having a predetermined width, and
wherein the inner peripheral surface of the ring shape is connected to the concave portion and the outer peripheral surface of the ring shape is connected to the second optical surface.

18. The display device according to claim 16, wherein the second optical surface is inclined with respect to the optical axis.

19. A luminous flux control member comprising:
an incident surface;
a first optical surface that is separated from the incident surface in a direction of an optical axis and includes a concave portion recessed toward the incident surface; and
a second optical surface that forms a side surface of the luminous flux control member,
wherein the first optical surface includes a connection portion that connects the concave portion to the second optical surface,
wherein a ratio of a height to a diameter in the luminous flux control member ranges from 0.5 to 5, and
wherein the diameter is the width in a direction perpendicular to the optical axis and the height is the optical axial size of the luminous flux control member.

* * * * *